United States Patent [19]

Garrison

[11] 4,359,282
[45] Nov. 16, 1982

[54] OPTICAL MEASURING METHOD AND APPARATUS

[75] Inventor: Marvin C. Garrison, San Carlos, Calif.

[73] Assignee: Ampex Corporation, Redwood City, Calif.

[21] Appl. No.: 207,168

[22] Filed: Nov. 17, 1980

[51] Int. Cl.$^3$ ............................................. G01B 11/24
[52] U.S. Cl. ..................................... 356/376; 33/297; 350/10; 350/91
[58] Field of Search ...................... 356/376, 381, 382; 350/10, 91; 33/297, 298

[56] References Cited

U.S. PATENT DOCUMENTS

| | | | |
|---|---|---|---|
| 2,607,270 | 8/1952 | Briggs | 356/381 |
| 3,191,490 | 6/1965 | Rabinow | 353/35 |
| 3,449,715 | 3/1970 | Hansen et al. | 350/10 |
| 3,804,523 | 4/1974 | McCormack | 356/382 |

Primary Examiner—R. A. Rosenberger

Attorney, Agent, or Firm—John A. Bucher; George B. Almeida; Joel D. Talcott

[57] ABSTRACT

A method and apparatus for measuring vertical surface variations of a specimen is disclosed wherein the specimen is mounted in movable relation to an objective lens assembly, a reticule being arranged at a focal plane of the objective lens assembly, movement between the objective assembly and the specimen necessary for maintaining the reticule in focus upon different surface portions of the specimen providing an indication of vertical spacing between the surface portions. Another embodiment of the invention contemplates a three-dimensional reticule arranged at or adjacent a focal plane of an objective lens assembly for simultaneously focusing portions of the reticule upon different surface portions of the specimen, the reticule being adapted to provide an indication that the vertical spacing between the different surface portions of the specimen is within acceptable limits.

16 Claims, 6 Drawing Figures

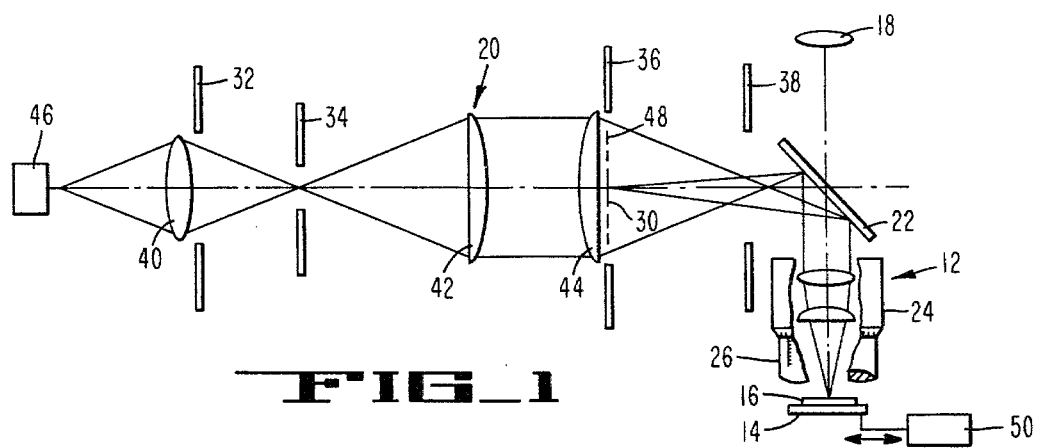
FIG_1
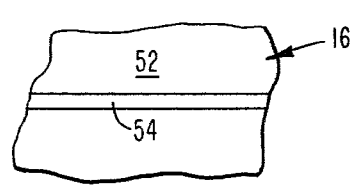
FIG_2
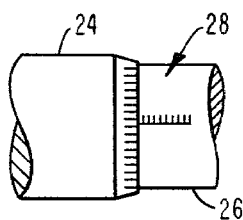
FIG_3
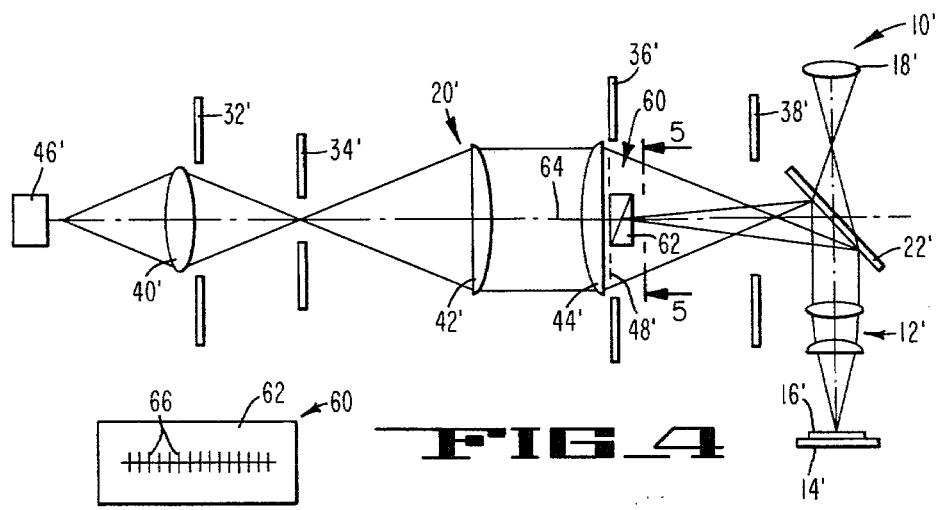
FIG_4
FIG_5
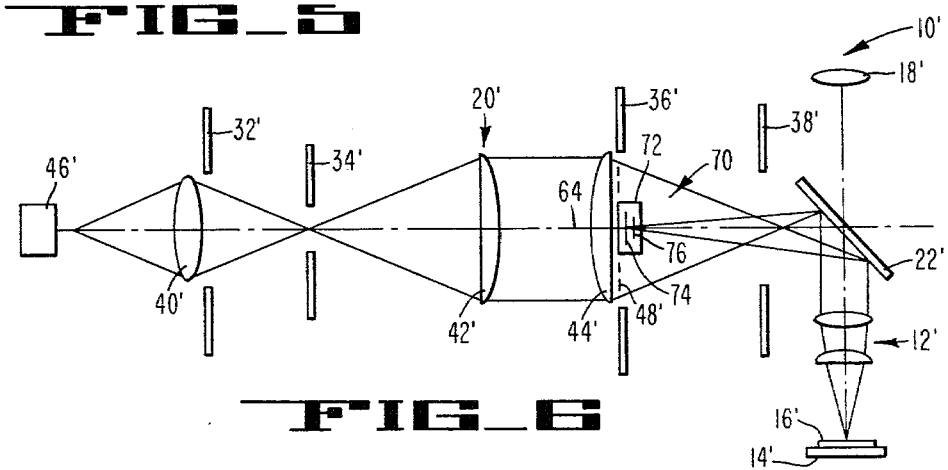
FIG_6

OPTICAL MEASURING METHOD AND APPARATUS

BACKGROUND OF THE INVENTION

The present invention relates to a method and apparatus for monitoring vertical surface variations of specimens on a microscopic scale and more particularly to such a method and apparatus wherein the monitoring function is carried out in a non-destructive manner with respect to the specimen.

There are many situations where it is essential to accurately measure or assess vertical dimensions or variations in surfaces of specimens on a microscopic scale. For example, such techniques are of importance in surface treatment of recording elements, thin film measurements required in connection with various semiconductor devices and the like. In such devices, it is important to be able to obtain accurate measurements of vertical dimensions in the surface in a non-destructive manner. Otherwise, the simple measurement step itself could produce unacceptable surface blemishes on the specimen or could interfere with operating integrity of the specimen.

Other uses will also be immediately apparent for the method and apparatus of the present invention. For example, in many applications, it is necessary to determine whether scratches or other surface blemishes are of sufficient depth to interfere with proper operation or functioning of the specimen or device. In other applications, it is necessary to accurately measure or monitor the depth of features such as scratches which may be on the order of less than 50 microinches in width and one to ten microinches deep. One of the devices most commonly employed in the past for such measurements included a diamond stylus moved across the surface of the specimen with transducer means indicating variations encountered by the diamond stylus. However, because of the hardness of the diamond stylus, it tended to penetrate portions of the surface of the specimen thereby preventing accurate measurement while also leaving undesirable marks upon the specimen surface. In any event, such surface profile measuring microscope do not have the resolution necessary for measuring features of the type described above. Similarly, multiple beam interferometry devices have been employed for such measurements but, at a typical magnification of one hundred to two hundred times (100–200X), they are not capable of sufficient resolution for accomplishing such measurements.

More recently, other optical or non-destructive techniques have been employed for measuring or monitoring vertical displacement or dimensions on a microscopic scale. For example, reference may be had to an article entitled "A Topographic Microscope" by Samuel Tolansky appearing at pages 54–59 in the August 1954 issue of *Scientific American* magazine. The device disclosed in that article relied on the use of an offset or oblique source of illumination for casting a shadow line across the entire surface of a specimen to be analyzed. Variations in vertical displacement could then be detected or assessed from observing non-linearities in the shadow line itself. However, even though relatively high resolution is possible with such techniques, it is necessary in each instance to calculate vertical displacement from the particular non-linearity of the shadow line observed for selective surface features as well as the angular relation of the light or illumination source to the surface of the specimen.

Other prior art devices have been disclosed for accomplishing similar measurement techniques but they have been based on generally similar operating parameters as those described above. Accordingly, there has been found to remain a need for a non-destructive method and apparatus for measuring or assessing vertical displacement or dimensions on a microscopic scale in various specimen surfaces or devices.

SUMMARY OF THE INVENTION

It is therefore an object of the invention to provide a method and apparatus for measuring vertical surface variations of a specimen on a microscopic scale in a non-destructive manner.

More specifically, it is an object of the invention to provide such a method and apparatus wherein a reticle is arranged at a focal plane of an objective means or lens assembly movable relative to a specimen, relative movement between the specimen and objective means, necessary to maintain the reticle in focus upon different surface portions of the specimen, being measured in order to determine vertical displacement between the different surface portions of the specimen.

Preferably, the invention contemplates the use of an optical profile measuring microscope including a vertical illuminator and a beam splitter for optically coupling the objective lens assembly with both the vertical illuminator and an eyepiece or viewing means, the reticule preferably being arranged at a principal focal plane formed within the vertical illuminator. With such an arrangement, the light source of the vertical illuminator is capable of casting a precise image of the reticule upon any selected surface portion of the specimen when that surface portion is brought into precise focus with the objective lens assembly. Accordingly, the present invention particularly contemplates such an optical profile measuring microscope wherein the objective lens assembly is formed with a relatively shallow depth of field in order to permit more precise focusing of the reticule image upon the selected surface portions of the specimens. Other variations are possible in addition to those described immediately above. For example, the profile measuring microscope may also be adapted for use with a transparent specimen, the transparent specimen being arranged between the objective lens assembly and the illuminator. The reticle would be arranged at a focal plane of the illuminator and accordingly at a focal plane relative to the objective lens assembly in the same manner described above.

With an arrangement of the type described above, vertical displacement or spacing between various surface features could be determined directly from a scale indicating relative movement between the objective lens assembly and the specimen. For example, a vernier scale of the type used with conventional microscopes could be employed for that purpose. Even further, it will be apparent from the preceding summary of the invention that the method and operation of the present invention could be accomplished by employing a microscope having suitable resolution and depth of field characteristics while modifying the microscope to include the combination of an objective lens assembly, a movable mounting for the specimen and a suitable reticle arranged at a focal plane of the objective lens assembly.

It is also an object of the present invention to provide an optical profile measuring microscope of the type described above which is adapted for operation as a topographic microscope capable of optically detecting or recording the profile of a specimen surface along a selected path. For this purpose, the invention further contemplates a combination as described above together with additional translating means for laterally shifting the specimen in order to cause an image of the reticule to track across the surface of the specimen. The reticule specimen may then be accurately focused upon different surface portions of the specimen in order to produce a reading corresponding to vertical displacement for those surface portions. As will be described in greater detail below, automatic focus means could be employed in place of a conventional viewing lens and coupled with the translating means and the focusing means of the profile measuring microscope so that the invention would function as a generally automatic topographic microscope.

It is yet another object of the invention to provide an optical profile measuring microscope of the type described above preferably including a filtered, monochromatic or coherent illuminator in order to further enhance accurate focusing of the reticule image upon selected surface portions of the specimen.

It is also an object of the invention to provide a method and apparatus for accurately assessing whether vertical surface dimensions of a specimen are within predetermined microscopic limits wherein a specimen is supported relative to an objective means or lens assembly, a three-dimensional reticule being arranged at or adjacent a focal plane of the objective with portions of the reticule being focused upon first and second vertically spaced-apart surface portions of the specimen, characteristics of the three-dimensional reticule being selected to provide an indication of the vertical spacing between the first and second surface portions being within acceptable limits.

In one embodiment of the invention, movement between the specimen and the objective lens assembly serves to assure that a reference surface of the specimen lies within the focal range for the reticule in order to focus the microscope.

In connection with both embodiments of the invention, it will also be apparent that suitable scale means may be employed within the reticule itself in order to provide a direct reading corresponding to vertical dimensions or displacement.

Additional objects and advantages of the invention are made apparent in the following description having reference to the accompanying drawings.

BRIEF DESCRIPTION OF THE DRAWINGS

FIG. 1 is a generally schematic representation of an optical profile measuring microscope of the type contemplated by the present invention and having a reticule arranged at a focal plane of the profilometer lens system.

FIG. 2 is a representation of a surface portion of a specimen of a type adapted for inspection of its surface by the optical profile measuring microscope of FIG. 1.

FIG. 3 is a fragmentary representation of a helical coupling and associated vernier scale employed for monitoring movement between the objective lens assembly and the specimen.

FIG. 4 is a schematic representation, similar to that of FIG. 1, of another embodiment of a profile measuring microscope according to the present invention including a three-dimensional reticule extending continuously between spaced-apart points on the axis of the focal plane to which the reticule is adjacent.

FIG. 5 is a fragmentary view taken along section line V—V of FIG. 4.

FIG. 6 is also a schematic representation of yet another embodiment of a profile measuring microscope according to the invention and including another variation of a three-dimensional reticule.

DESCRIPTION OF THE PREFERRED EMBODIMENTS

Referring now to the drawings, it may be seen that the apparatus of the present invention is preferably embodied in an optical device generally similar in many respects to a conventional microscope. The method of the invention is also adapted to be carried out by such an optical device. Referring for example to FIG. 1, an optical profile measuring microscope according to the present invention is generally indicated at 10 and includes an objective or objective lens assembly 12 and a relatively movable mount 14 for supporting a specimen of the type indicated at 16. It would of course also be possible to fix the mount 14 with the optical components of the microscope being movable to accomplish the same purpose.

Various components of the profile measuring microscope 10 are arranged within a conventional housing, only portions of which are illustrated as described below. The objective lens assembly 12 is commonly fixed within the housing in precise alignment with an eyepiece or viewing lens 18 and the vertical illuminator generally indicated at 20. The vertical illuminator includes a beam splitter in the form of an inclined glass plate reflector 22 arranged intermediate the objective lens assembly 12 and the eyepiece 18 for simultaneously transmitting light from the illuminator 20 to the specimen 16 and transferring an image of the specimen to the eyepiece.

Relative movement between the objective lens assembly 12 and the movable mount 14 for the specimen 16 is provided by relatively movable portions of the housing as may be seen in the fragmentary representation of FIG. 3. The objective lens assembly 12 is axially fixed within a cylindrical housing member 24, the movable mount 14 and specimen 16 being carried by a relatively movable housing member 26. The housing members 24 and 26 are interconnected by helical threads and provided with vernier scale means 28 in order to provide a precise indication of relative movement between the specimen 16 and the objective lens assembly 12.

Within such a combination, the present invention contemplates the mounting of a reticule 30 at or adjacent a focal plane of the optical profile measuring microscope system 10. With the objective lens assembly 12 and the vertical illuminator 20 being in fixed relation to each other, the reticule may be mounted at a focal plane in either of those components. However, the invention preferably contemplates mounting the reticule 30 within the vertical illuminator as indicated in FIG. 1 so that the reticule is not interposed between the eyepiece 18 and the specimen 16. The reticule may be in any of a variety of configurations depending upon a particular application in which it is to be employed. For example, the reticule could be formed as cross hairs, as a series of dots or as a planar pattern of selected geometric configuration. As is specifically illustrated in FIG. 1, the reticule 30 may also be in the form of a simple line entirely arranged within a focal plane of the objective. Even a line of this type is sufficiently two-dimensional for purposes of the present invention to permit movement of the specimen 16 relative to the objective lens assembly 12 in order to focus the reticule upon a selected surface portion of the specimen and obtain an accurate indication of vertical displacement or dimension.

The vertical illuminator illustrated in FIG. 1 includes a number of diaphragms indicated respectively at 32, 34, 36 and 38. These diaphragms in combination with a plurality of lenses 40, 42 and 44 transmit light from a suitable source 46 into the objective lens assembly 12 by means of the beam splitter 22 for illumination of the specimen 16. Preferably, the light source 46 may include filter means or otherwise be adapted to provide monochromatic or coherent light in order to enhance precise operation of the profilometer.

As may be seen in FIG. 1, the diaphragm 38 is a conventional aperture diaphragm while the adjacent diaphragm 36 is a field diaphragm defining the geometric outline of the light transmitted through the objective lens assembly to the specimen. The field diaphragm is accordingly arranged at a principal focal plane 48 and the reticule 30 is preferably arranged within that focal plane as indicated in FIG. 1. Thus, the reticule 30 may be in the form of a grid or transparent plate mounted upon the field diaphragm.

It will be apparent from the following description of the method of operation that it is necessary to place an image of the reticule in focus upon different surface portions of the specimen. In some applications, it may even be desirable to laterally move the specimen so that the image of the reticule is tracked along a selected path on the surface of the specimen. Accordingly, the optical profile measuring microscope 10 preferably includes a mechanical stage translator 50 which is interconnected with the movable mount 14 so that the specimen may be moved laterally according to a predetermined pattern. However, it will also be apparent that lateral movement of the specimen may be accomplished for example by simple manual manipulation. In some applications for the optical profilometer 10, it may be desirable to provide for automatic operation of the profile measuring microscope in order to produce a series of dimensional readings taken along a preselected path along the surface of the specimen. For example, an image of the reticule 30 could be moved along a path formed on the surface of the specimen by appropriate operation of the mechanical stage 50. At the same time, the simple eyepiece or viewing lens 18 could be replaced by an autofocusing device coupled by suitable servo-mechanisms interconnected with the movable coupling between the objective lens assembly 12 and the movable mount 14 as well as with the mechanical stage translator 50. With such a combination, which is not illustrated in the drawings, it would be possible to produce a series of readings corresponding to vertical dimensions or displacement between various surface portions of the specimen. For example, the specimen could be a semiconductor device having depositions of various types on different surface portions. Through an arrangement of the type referred to above, the optical profilometer of the present invention could be adapted to provide a reading corresponding to the depth of deposition for the various surface portions.

Returning again to the specific embodiment illustrated in FIG. 1, a fragmentary portion of the specimen 16 is shown in FIG. 2 having a surface 52 with another surface portion 54 in the form of a scratch extending across the specimen. The profile measuring microscope of the present invention could be employed for measuring the depth of the crack or the vertical displacement between the surface portions 52 and 54 by first focusing an image of the reticule 30 upon the main surface portion 52 of the specimen. Thereafter, the reticule image could be focused upon the surface portion 54, the vertical distance between the two surfaces being directly indicated by the respective readings on the scale means 28 for the two focused positions. Accordingly, this embodiment of the invention provides a particularly accurate and precise means for measuring vertical displacement of surfaces on a specimen in a non-destructive manner. It will be further apparent that in the embodiment of the invention as described above, it is particularly desirable to form the optical profile measuring microscope with a minimum depth of field so that focusing of the reticule image upon any selected surface portion of the specimen is particularly sensitive to the position of the specimen relative to the objective lens assembly.

Before leaving the embodiment of FIG. 1, it is again noted that the reticule 30 may be arranged at or adjacent any principal focus of the profile measuring microscope system. Furthermore, the specific configuration of FIG. 1 is adapted for viewing surfaces of opaque specimens. The combination of the present invention could also be adapted for example to biological microscopes for viewing transparent specimens. In such an application, the profile measuring microscope 10 could have an illuminator of a type conventionally employed within such biological microscopes where the transparent specimen would be supported upon a movable mounting in the same manner as described above, the illuminator however being arranged beneath the specimen mount and in fixed optical relation to the objective assembly as described above. Accordingly, it will be immediately apparent that such a combination would include the same relative arrangement of components, with the addition of a second "objective" to focus the reticule image, as described above in connection with FIG. 1. However, in FIG. 1, the objective serves a double purpose. First as a projector to project an image of the reticule and then, as the light comes from the other direction (from below a transparent specimen), to act only as a microscope objective to inspect the reticule image. In a biological microscope with a transparent specimen, the light rays traverse the optical system in only one direction and the objective does not serve a dual function. The reticule could still be arranged at or adjacent any principal focus of the system, even within the illuminator disposed beneath the transparent specimen. Such a variation of the invention would be particularly suitable to accurately measure various dimensions of biological specimens or other transparent specimens, given their respective refractive index.

Yet another embodiment of the invention is illustrated in FIGS. 4 and 6 which each include a three-dimensional reticule as will be described in greater detail below. Otherwise, the optical profile measuring microscope of FIGS. 4 and 6 is indicated at 10' and includes similar components as were described above in connection with FIG. 1.

In FIG. 4, a three-dimensional reticule 60 is arranged at or generally adjacent the principal focal plane 48' within the illuminator system of the profile measuring microscope. The three-dimensional reticule 60 is also illustrated in FIG. 5. Referring to both of FIGS. 4 and 5, the reticule 60 is formed in a transparent plate 62 as a line which is inclined or slanted relative to the principal focal plane 48'. In other words, the linear reticule 60 of FIGS. 4 and 5 is slanted or inclined so that various points along its length are spaced apart along the axis 64 for the focal plane 48'. Here again, the three-dimensional reticule of the present invention may be in any of a variety of configurations. Furthermore, although the linear reticule 60 would in itself appear to be only two-dimensional, it may be seen that any point along the line is sufficiently two-dimensional in order to permit its image to be focused upon a surface portion of the specimen in the same manner described above. Accordingly, with various point portions of the linear reticule 60 being at different locations along the axis 64, it may be seen that the reticule 60 is of a three-dimensional nature at least for purposes of the present invention.

As may be best seen in FIG. 5, gradations 66 of predetermined spacing are formed along the linear reticule 60 in order to further adapt the profile measuring microscope for providing an immediate reading corresponding to vertical displacement between various surface portions. For example, the specimen 16' could be laterally positioned so that different point locations along the linear reticule 60 would be focused upon different surface portions of the specimen. With such a combination, the gradation 66 would then provide an immediate indication as to the spacing between those surface portions.

Similarly, a three-dimensional reticule 70 is illustrated in FIG. 6. Referring now to that FIGURE, the three-dimensional reticule 70 is again formed within a transparent plate 72 disposed adjacent the principal focal plane 48' of the illuminator system. Within the plate 72, two linear or planar reticule elements 74 and 76 are arranged in spaced-apart relation along the axis 64 of the focal plane 48'. Such a combination could be employed generally in the same manner as described for the embodiments of FIGS. 1 and 4 but in applications for determining whether different surface portions of a specimen are at a predetermined vertical dimension. For example, if the specimen of FIG. 2 were a semiconductor device with the surface portion 54 being a base surface and the surface 52 being a coating formed thereupon, the reticule element 74 could be focused upon the base surface portion 54, focusing of the other reticule element 76 upon the surface portion 52 then indicating that the vertical displacement between the two surfaces corresponds to spacing between the reticule elements 74 and 76. Accordingly, an optical profile measuring microscope with such a three-dimensional reticule could be operated as a go-no-go gauge for determining whether vertical dimensions are at a predetermined vertical displacement. Again, it will be apparent that the profile measuring microscope could be employed for determining whether such a vertical spacing between different surface portions is within a satisfactory range if the depth of field for the optical profile measuring microscope were increased sufficiently to permit focusing of the reticule element 74 and 76 on the different surfaces as long as the vertical displacement between the two surfaces were within predetermined limits.

In each of FIGS. 4 and 6, the adjustable mounting for varying the distance between the specimen and the objective lens assembly could be employed in generally the same manner as described above in connection with FIG. 1. For example, referring to FIG. 6, the position of the specimen could be adjusted relative to the objective lens assembly so that one of the reticule elements is in precise focus upon a base surface portion of the specimen. The two-dimensional character of the reticule of FIG. 6 would then provide an indication of vertical displacement in the manner described above.

Additional variations within the method and apparatus of the present invention will be apparent from the preceding description. For example, it will be apparent that a three-dimensional reticule effect of the same type described in connection with FIGS. 4 and 6 could also be achieved with the embodiment of FIG. 1 including the linear or planar reticule 30. Within the combination of FIG. 1, a three-dimensional effect could be achieved by sufficiently increasing the depth of field for the optical profilometer 10 so that its two-dimensional reticule 30 would be capable of being focused upon different surface portions of the specimen 16 as long as the vertical displacement between those surface portions were within predetermined limits corresponding to the depth of field for the profile measuring microscope.

Accordingly, the scope of the present invention is defined only by the following appended claims.

What is claimed is:

1. An optical gauge for determining if vertical surface dimensions of a specimen are within predetermined limits, comprising
an objective means,
mounting means supported relative to the objective means for mounting the specimen,
means for viewing the specimen through the objective means, and
three-dimensional reticule means arranged adjacent a focal plane of the objective means for focusing portions of the reticule means upon first and second vertically spaced apart surface portions of the specimen, the three-dimensional reticule means being adapted to provide an indication of vertical spacing between the first and second surface portions being within acceptable limits.

2. The optical gauge of claim 1 further comprising an illuminator for illuminating the specimen.

3. The optical gauge of claim 2 wherein the reticule means is arranged at a principal focal plane formed within the illuminator.

4. The optical gauge of claim 3 further comprising beam splitter means arranged intermediate the objective means and the viewing means, the illuminator being a vertical illuminator arranged in optical alignment with the objective means through the beam splitter.

5. The optical gauge of claim 1 further comprising an illuminator system including a source of filtered, monochromatic or coherent light for illuminating the specimen.

6. The optical gauge of claim 1 further comprising means for adjusting position of the mounting means relative to the objective means for focusing a selected portion of the three-dimensional reticule means upon a surface portion of the specimen.

7. The optical gauge of claim 1 wherein the three-dimensional reticule means includes a plurality of two-dimensional portions arranged in spaced-apart relation along the axis of the focal plane.

8. The optical gauge of claim 1 wherein the three-dimensional reticule means includes a reticule element slanted relative to the focal plane so that different portions of the reticule element are spaced apart along an axis for the focal plane.

9. In a method for determining if vertical surface dimensions of a specimen are within predetermined limits, the steps comprising mounting a specimen with relation to an objective means including means for viewing surface portions of the specimen, and arranging a three-dimensional reticule adjacent to a focal plane of the objective means for focusing portions of the reticule upon vertically spaced-apart surface portions of the specimen, the three-dimensional reticule being adapted to provide an indication of the vertical spacing between the first and second surface portions being within acceptable limits.

10. The method of claim 9 further comprising an illuminator for illuminating the specimen.

11. The method of claim 10 wherein the reticule means is arranged at a principal focal plane formed within the illuminator.

12. The method of claim 11 further comprising beam splitter means arranged intermediate the objective means and the viewing means, the illuminator being a vertical illuminator arranged in optical alignment with the objective means through the beam splitter.

13. The method of claim 9 further comprising an illuminator system including a source of filtered, monochromatic or coherent light for illuminating the specimen.

14. The method of claim 9 further comprising means for adjusting position of the mounting means relative to the objective means for focusing a selected portion of the three-dimensional reticule means upon a surface portion of the specimen.

15. The method of claim 9 wherein the three-reticule means includes a plurality of two-dimensional portions arranged in spaced-apart relation along the axis of the focal plane.

16. The method of claim 9 wherein the three-dimensional reticule means includes a continuous reticule element slanted relative to the focal plane so that different portions of the reticule element are spaced apart along an axis for the focal plane.

* * * * *